May 2, 1961 N. H. ENENSTEIN 2,982,955
MOVING TARGET INDICATING SYSTEM
Filed July 25, 1950 5 Sheets-Sheet 3

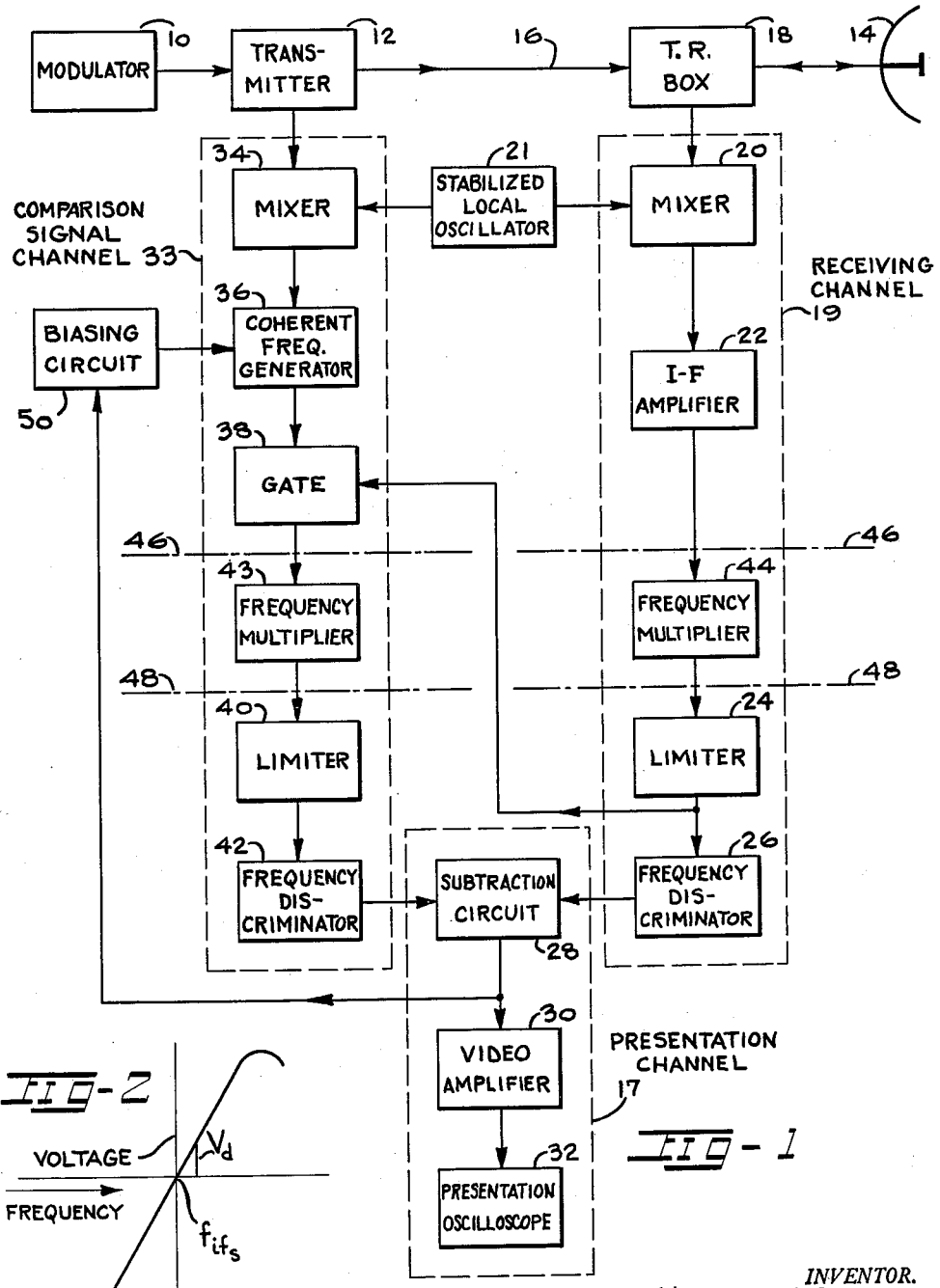

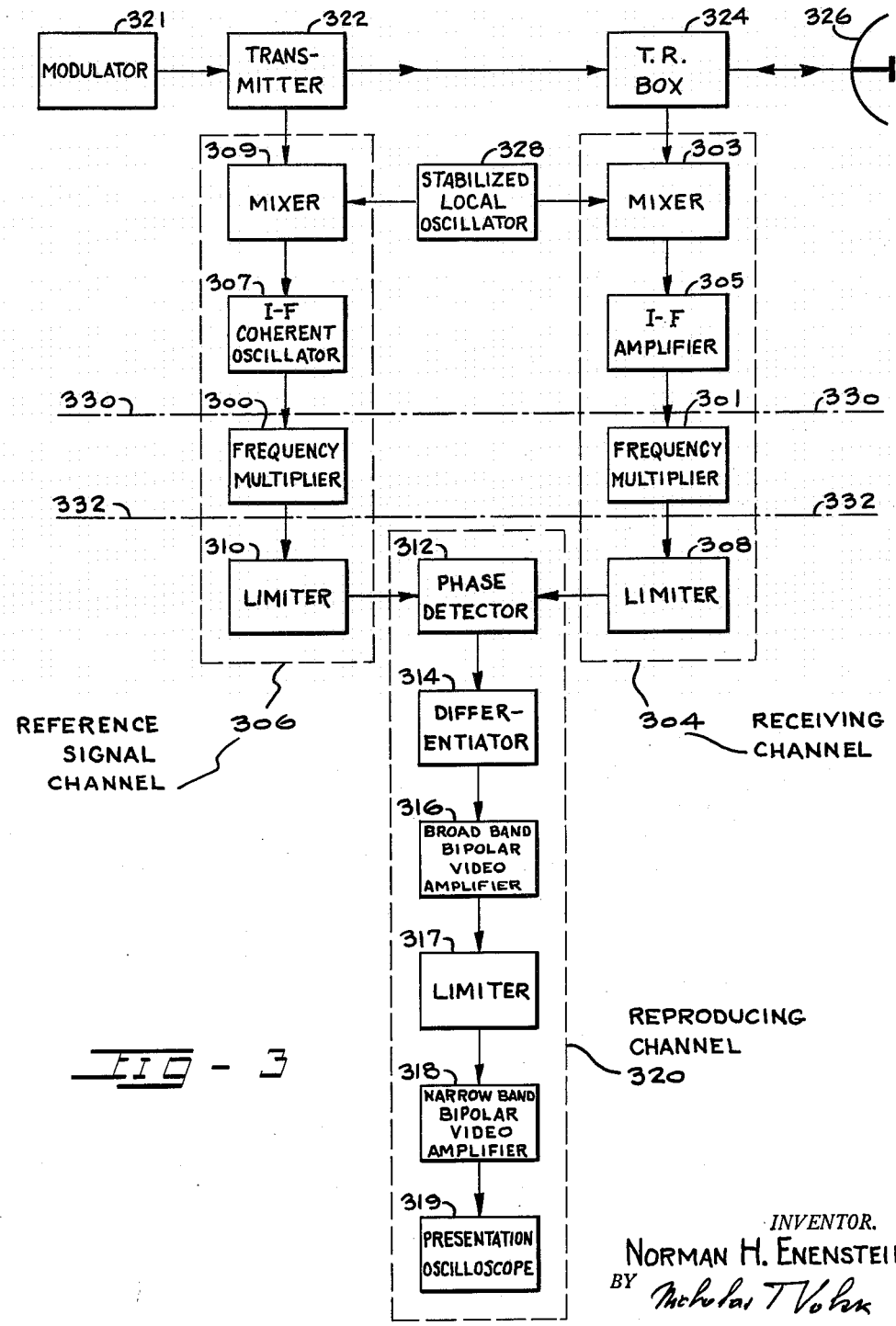

INVENTOR.
NORMAN H. ENENSTEIN
BY Nicholas T. Vohr
ATTORNEY

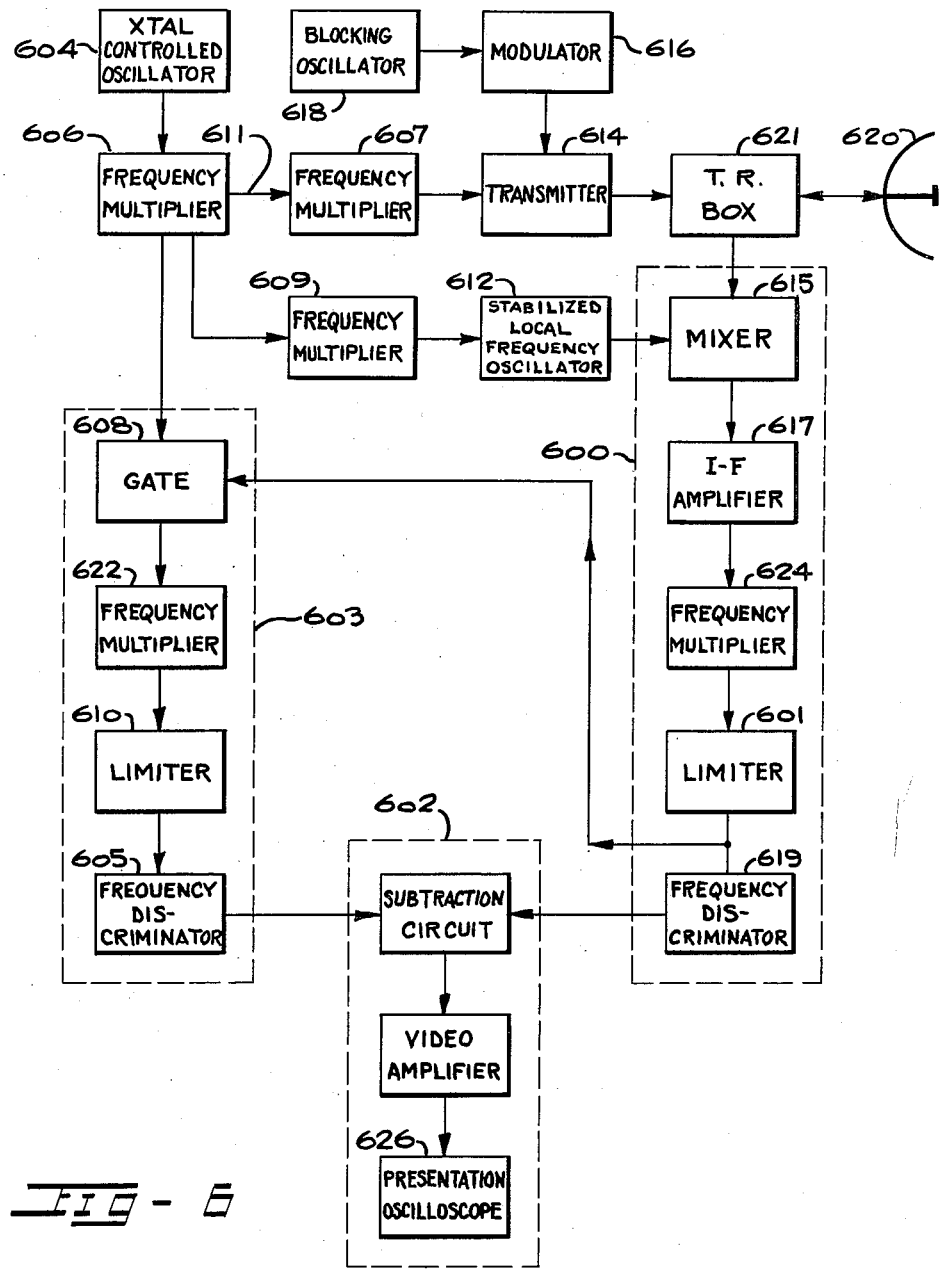

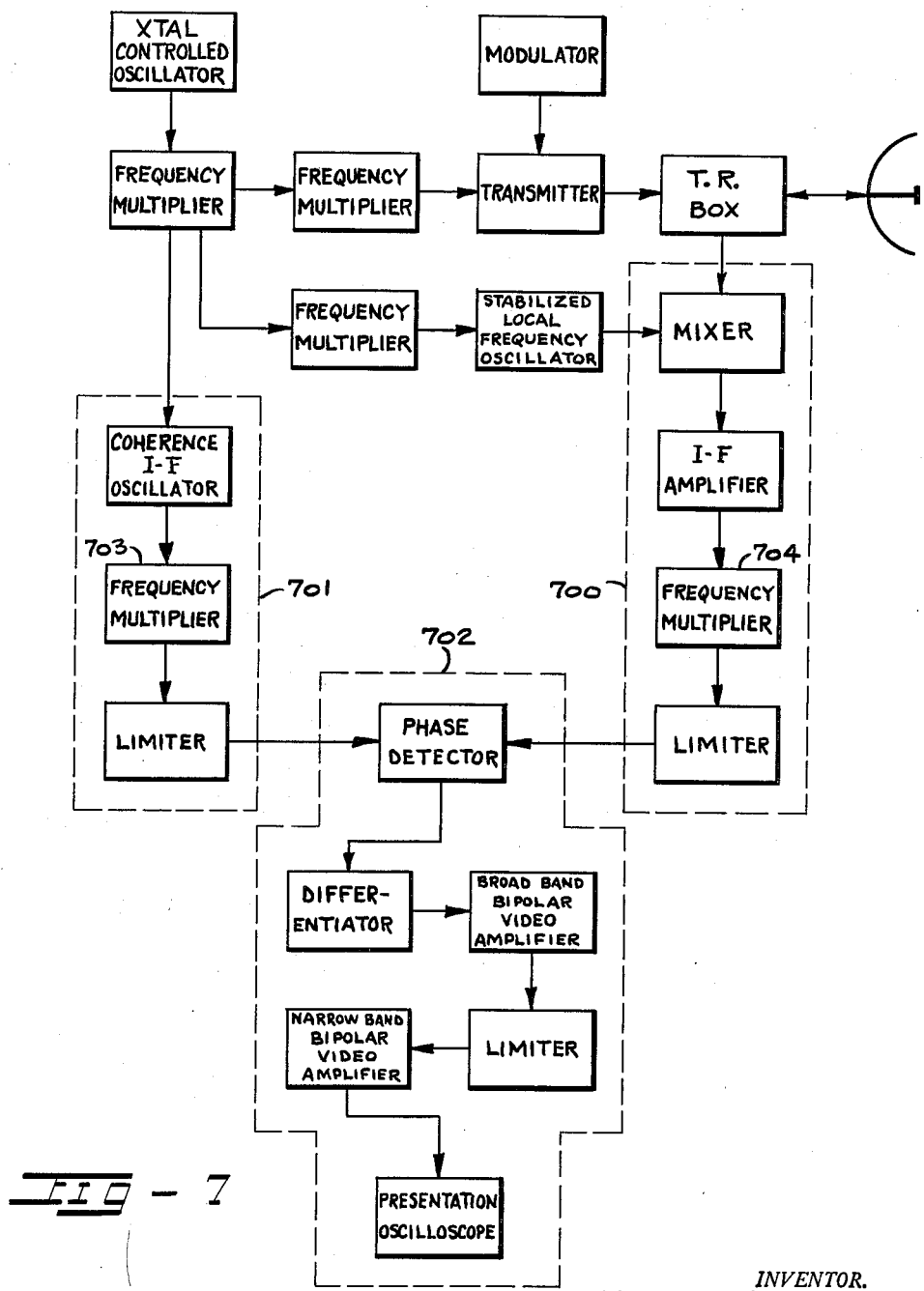

United States Patent Office 2,982,955
Patented May 2, 1961

2,982,955

MOVING TARGET INDICATING SYSTEM

Norman H. Enenstein, Los Angeles, Calif., assignor, by mesne assignments, to Hughes Aircraft Company, a corporation of Delaware Filed July 25, 1950, Ser. No. 175,797

7 Claims. (Cl. 343—7.7)

This invention relates to radar systems, and more particularly to moving target indicating radar systems.

In the moving target indication systems, as the name of such systems implies, only moving targets appear in the radar presentation while echoes from stationary targets are eliminated. The chief aim in such a system is to reduce the ground return signal which often masks targets in the vicinity of the ground. The Doppler principle has been the basis for practical moving target indication systems. To date, there have been two important types of moving target indication systems in actual use, namely, the so-called "continuous wave radar system" and the "two-pulse target indicating system," the latter using a mercury delay line. Description of such systems may be found in "Radar System Engineering" by Ridenour, Book No. 1, MIT Radiation Laboratories Series, McGraw-Hill Book Co., Inc., 1947, chapter 5, pages 127 through 159, and also chapter 16, pages 626 through 679.

The continuous wave radar system operates directly on the Doppler frequency shift from a moving target. The returned signal meets with the continuous wave transmitted signal also appearing in the receiver, and the Doppler frequency is extracted in the receiver when the received echo is heterodyned with the output of the transmitter oscillator. This is described on page 629 of the above reference. In the systems of this kind, the transmitter frequency must be held stable for the duration of the time that it takes the signal to reach and return from the target. Although a simple moving target indicating system results, the limited amount of information furnished by a continuous wave radar system limits its application. The main limitation of such a system resides in the fact that although it gives indication of the presence of a moving target in a certain area, it does not give accurate range information or range resolution.

In order to obtain range determinations, as well as azimuth and elevation data, it becomes necessary to use a pulsed radar system. Since the final result in such a system is determined by means of two received consecutive echo pulses from the same target, it may be called a "two-pulse system." The two-pulse Moving Target Indicating (MTI) system is used exclusively at present. In a pulsed system there is no radio frequency reference continuous wave signal for the return signal to beat with, since a magnetron transmitter supplies its signal only for the duration of the transmitted pulse. In pulsed radar systems, the coherence signal is generated at the I.F. level. A small fraction of the energy from the exploratory pulse of the transmitter is mixed with the signal from the stabilized local oscillator to produce a synchronized pulse at I.F. level. This I.F. pulse is used to control the frequency and the phase of the coherent intermediate frequency oscillator. This continuous wave oscillator is started anew by each synchronizing pulse. The returned signal is compared to the reference coherent intermediate frequency oscillator and the Doppler frequency is extracted. This Doppler frequency acts as an amplitude modulation on the series of pulses from a moving target. Moving targets are thus differentiated from fixed targets by this variation in amplitude from pulse to pulse. Thus, if in a series of two-pulse frames one is subtracted from the other, only the returned echoes from the moving target will have a difference other than zero, since the amplitude in the cancellation section of fixed target pulses would remain constant from pulse to pulse.

In order to compare the echoes of one duty cycle or frame with the echoes of the next duty cycle, a mercury delay line is used which is adjusted to delay all echo signals by a repetition period.

The chief disadvantages of the two-pulse system are its inherent complexity and critical operating conditions. The usefulness of the two-pulse systems is limited by the difficulty of maintaining the frequencies of the transmitter, of the stable local oscillator, and of the coherent intermediate frequency oscillator very nearly constant; the stability of the mercury delay line, which is sensitive even to small temperature changes, fluctuations in the amplitude of received echoes due to scanning of the antenna pattern, ground clutter fluctuations produced by numerous small individual moving targets located on the ground and illuminated by exploratory pulses, amplitude variations in echoes received from moving targets whose presence and position is to be located, and the presence of "blind speeds," or the speeds at which indications of moving targets disappear altogether. These limitations of the two-pulse (MTI) Moving Target Indicator systems are discussed on pages 638–655 and 658–676 of the previously identified vol. I of the Radiation Laboratory series.

Ground clutter fluctuation is one of the most serious limitations of the two-pulse moving target indicating systems now in use. Since the derived amplitude variations, from signal-to-signal, from the moving target are relatively small in comparison to existing ground clutter when MTI is needed, it becomes a matter of primary importance to preserve and extract this difference with the utmost degree of accuracy. This is prevented in the two-pulse systems because the ground clutter has amplitude variations having a period of its own which are beyond one's control. If the period of time which elapses between the echo signals whose amplitudes are to be compared is long, it begins to approach the periods of the ground clutter spectrum. When this is the case, the ground clutter itself may introduce a considerable error or complete obliteration of the amplitude difference between the echo signals from those moving targets whose presence and location are of real interest. From the above, it follows that the shorter is the period of the comparison duty cycle, the greater is the possibility of eliminating the interference or obliteration of the intelligence signals by the ground clutter.

The difficulty of maintaining the frequencies of the transmitter, local oscillator, and of the coherent intermediate frequency oscillator in the two-pulse system, is the result of an inherently long duty cycle, comparatively speaking, of the two-pulse systems. As stated previously, in the moving target indicating system of the prior art, the echo produced by the moving target in response to exploratory pulse #1 is compared to the amplitude of the echo produced in response to exploratory pulse #2. Accordingly, in the systems of the above type, two exploratory pulses are required for deriving the difference in the amplitudes between the two echoes, and the period of time which elapses between the reception of one moving target echo in response to the exploratory pulse #1 and the echo in response to pulse #2 can never be shorter than the duration of one complete duty cycle of the radar system; i.e., the time interval between the transmission of two sequential exploratory pulses. Since the duration of one duty cycle, speaking in terms of absolute frequency stabilities of all components, is significant, the frequency stability requirements are higher than the frequency stability requirements necessary with the disclosed system, which, as described below, is a single-pulse system. Thus, in the disclosed system the useful duty cycle may have a period which is shorter than the duration of one complete duty cycle, i.e., it may be a fraction of its duration when the range of the moving target is shorter than the full range of the system. For a more detailed description of the required frequency stabilities for the two-pulse MTI systems, reference is made to the previously identified vol. I of the Radiation Laboratory Series, and more particularly to Table 16.1, page 642. As stated in the above table, the modulator stability, for example, must be within $1/50$ of a microsecond, and the relative drift in the delay line must not exceed $1/50$ of a microsecond per hour. These are exceedingly critical values which are attainable only when every known parameter control is functioning at its best.

The same two-pulse requirement of the prior systems necessitates the use of the mercury delay line. Elimination of delay lines would achieve two purposes: It would eliminate a very critical part of the system, and it would impose less critical stability on the modulation channel. It is advantageous to avoid the use of mercury delay lines since they are rather critical, must be temperature compensated, and their use imposes very critical requirements on the stability of modulators, i.e., the repetition rate must be very exact. The latter requires the use of a special circuit for maintaining the pulse repetition rate very accurately in order to assure the precise superposition of successive duty cycles for the elimination of fixed echoes. When there is a change in the delay introduced by the mercury delay line, or an independent change in the pulse repetition rate, the elimination of fixed echoes is prevented and they are reproduced on the oscilloscope screen together with the reproduction of moving targets.

The invention discloses moving target indicating systems for pulsed radar which are inherently simpler than the two-pulse moving target indicating system of the prior art and which produce more faithful reproduction of moving targets. The simplicity of the system resides in the fact that the information is extracted from each pulse as it occurs, and therefore no mercury delay line is required. Moreover, since the disclosed systems use the echo signal received in response to a single transmitted pulse, the required frequency stability may be restricted to a shorter period of time, i.e., this shorter period of time, at most, is equal to one duty cycle for targets located at the extreme outer end of available range, and is shorter than the duty cycle for targets at shorter range. This is accomplished by comparing the signal returned from the moving target with the locally generated signal.

In one system all echo signals received from all targets are impressed on a frequency discriminator circuit, the output of which is zero when the frequency of the incoming signal is equal to the transmitted frequency. Therefore, as long as the transmitted frequency remains constant no fixed target signal appears in the output of the frequency discriminator; however, all moving targets will produce signals because their echoes differ from the transmitted frequency owing to the Doppler effect. Therefore, the amplitudes of the echoes from the moving targets, as they appear in the output of the discriminator, are a function of the Doppler frequency, which in turn is a function of the velocity of the moving objects with respect to a radar station. Since there is a possibility of local oscillator frequency instabilities, primarily in a transmitter, the system also includes a comparison signal channel for generating a signal having an amplitude proportional to the transmitted frequency, and a subtraction circuit for combining the signals from the discriminator circuit with the signal from the comparison signal channel. The subtraction circuit produces an output signal whose amplitude is proportional to the amplitude difference between the combined signals, thereby nullifying the effect of frequency drifts, even though a signal appears in the output of the frequency discriminator, in such case, in response to the echoes from stationary targets.

According to another version of the invention, all echoes are impressed on a phase detector where the phase of all incoming signals is compared with the phase of a locally generated reference signal.

A constant amplitude signal, or no signal, is produced in the output of the phase detector by echoes from stationary targets. Echoes from moving targets produce a variable amplitude signal, the amplitude variations being a function of the Doppler frequency. Constant amplitude signals are eliminated by subsequent differentiation.

Whether the system uses the frequency discriminators or a phase detector, and differentiator, the output of the frequency discriminator or the output of the differentiating circuit may be enlarged by multiplying by the same factor the intermediate frequency in the receiving and the comparison or the reference signal channels. Also, in either case, the transmitting channel may be of conventional type consisting of a modulator and a transmitter, or it may include a crystal-controlled oscillator whose frequency is multiplied many times in order to attain a microwave signal which is finally impressed on the transmitter. In either case, the coherence frequency is controlled by an intermediate frequency produced in the output of the mixer connected on its input side to a transmitter and a stabilized local oscillator.

It is therefore one of the objects of this invention to provide moving target indicating systems in which moving target indications are obtainable in response to a single transmitted exploratory pulse.

It is also an additional object of this invention to provide single pulse moving target indicating systems in which all received echoes are impressed on a frequency discriminator circuit tuned to an intermediate frequency so that, with the transmitter frequency being equal to the center frequency of the transmitted frequency spectrum, no output signal normally appears in the output of the discriminator in response to the received echoes from stationary objects, and an output proportional to the Doppler frequency appears in response to the echoes produced by the moving targets.

It is an additional object of this invention to provide single pulse moving target indicating systems providing a receiver circuit which is sensitive to the frequency of received echo signals by being tuned to the center intermediate frequency of the intermediate frequency spectrum obtainable in the receiver so that no signal normally appears in the output of the circuit in response to the echoes received from stationary objects and a signal appears in response to the echoes received from moving targets, said system also including a comparison signal channel for eliminating all echoes from stationary objects even when the frequency of the transmitted signal, and therefore the intermediate frequency, depart from the normal center intermediate frequency.

It is still another object of the invention to provide single-pulse moving target indicating systems in which all received echoes are impressed on a phase detector-differentiator circuit which generates a useful signal only when the phase of received echoes changes continuously, which is the case only with the echoes received from moving targets, whereby all echoes from fixed objects are blocked in the circuit and thus are not reproduced on an oscilloscope screen.

Still another object of this invention is to provide single-pulse moving target indicating systems utilizing frequency multipliers, after the intermediate frequency stages in the receiving and reference channels, for enlarging the frequency difference between the Doppler frequency and the frequency of the comparison or reference signal.

It is an additional object of the invention to provide single-pulse moving target indicating systems having a transmitting channel, a receiving channel and a reference signal channel, the transmitting frequency of the system being obtained by multiplying the output of a synchronizing crystal-controlled oscillator until a microwave frequency is reached and then modulating this frequency in a conventional manner in order to obtain exploratory pulses of any desired duration, and utilizing the output of some of the frequency-multiplying stages for obtaining stable intermediate frequencies in the receiving and reference channels.

It is also an object of this invention to provide the novel features which are believed to be characteristic of the invention as set forth particularly in the appended claims. The invention itself, however, both as to its organization, method of operation, and method of manufacture, together with further objects and advantages thereof, may best be understood by reference to the following description taken in connection with the accompanying drawings in which:

Fig. 1 is a block diagram of a single-pulse moving target indicating system having a receiving channel and a comparison signal channel, both channels utilizing frequency discriminators whose outputs are impressed on a subtraction circuit for eliminating fixed target echoes from the screen of a presentation oscilloscope;

Fig. 2 is a characteristic curve of a typical frequency discriminator suitable for the system disclosed in Fig. 1;

Fig. 3 is a block diagram of a single-pulse moving target indicating system utilizing a phase detector circuit and a differentiator for eliminating all echoes from stationary objects;

Figure 4:
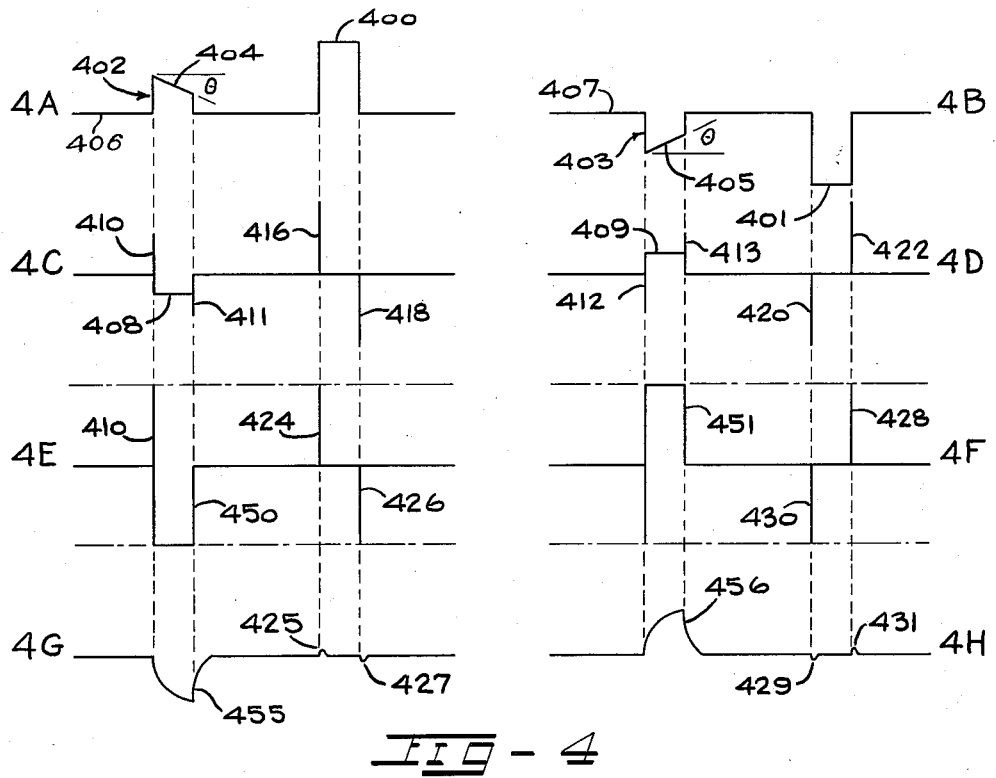
Fig. 4 illustrates oscillograms of signals appearing in the reproducing channel of Fig. 3.

Fig. 6 is a block diagram of the modified version of a single-pulse moving target indicating system illustrated in Fig. 1, the modification residing in the utilization of a crystal-controlled synchronizing oscillator and frequency multipliers in the transmitting and synchronizing portion of the system for stabilizing the transmitted frequency as well as the intermediate frequencies in the receiving and reference signal channels;

Fig. 7 is a modified version of the system disclosed in Fig. 3, the modification residing in the utilization of a crystal-controlled oscillator and frequency multiplying circuits for stabilizing the transmitted frequency as well as the intermediate frequencies in the receiving and reference signal channels.

A brief description of the first version of the entire system will be given first, and this will be followed with its more detailed description.

Referring to Fig. 1, there is shown a block diagram of the system utilizing frequency discriminators for eliminating fixed target echoes. A receiving channel 19 receives all echoes and thus constitutes a receiver per se of the system. A comparison or reference signal channel 33 generates signals for cancelling all echoes from stationary targets in a subtracting circuit 28 which is connected to the output ends of the two channels. Therefore, only moving target echoes appear on a presentation oscilloscope 32. Frequency discriminators 26 and 42 are used in both channels for generating a video signal only when there is a shift in the transmitter frequency since both frequency discriminators are tuned to the center predetermined intermediate frequency of the system. Accordingly, when the frequency of the transmitted signal is equal to the center frequency of the frequency spectrum generated by a transmitter 12, the intermediate frequency and the outputs of the frequency discriminators 26 and 42 are equal to zero.

If it were not for drifts in the transmitter frequency, which cannot be avoided altogether with transmitters using magnetrons and line-pulse modulators, or even when high-power klystrons are used as a transmitter, the use of the comparison signal channel would be unnecessary altogether, since the frequency discriminator in the receiving channel would produce signals only in response to echoes from moving targets. This is the case because only the moving targets produce echoes having a frequency which differs from the transmitter frequency by the Doppler effect.

Referring to Fig. 1 now more in detail, a modulator 10 is connected to transmitter 12 which generates a pulsed microwave signal having a center frequency $f_0$ and impresses it on a directive antenna 14 over a waveguide or wire propagation system 16. The entire transmitting channel may be any conventional type of radar transmitting channel; for example, a transmitter utilizing a magnetron for generating an exploratory pulse whenever pulse modulator 10 impresses high cathode-anode voltage across the magnetron, may be used. This pulse is radiated by antenna 14 and the echoes received by the same antenna are directed through a TR box 18, which is an automatic transmit-receive switch, to a mixer 20. Mixer 20 is connected to a stabilized local oscillator 21, which furnishes a signal having a local frequency of $f_L$. As the name of this oscillator implies, the frequency of this oscillator is stabilized by means of an external resonant cavity. For a more detailed description of the stable local oscillators, reference is made to the previously mentioned vol. 1, sec. 16.15, page 659, of M.I.T. Radiation Laboratory Series, which is made a part of this disclosure. This frequency, $f_L$, is impressed on mixer 20 with the result that the output of the mixer contains echo signals from all targets, the fixed targets being expressed by the difference between the transmitted frequency and the frequency of stabilized oscillator 21, namely;

Fixed target signal frequency=$f_{if_S}$=$(f_0-f_L)$ where $f_{if_S}$ is a predetermined frequency equal to the fixed target center intermediate frequency, $f_0$ is the center frequency of the exploratory, transmitted pulse, and $f_L$ is the stabilized local oscillator frequency.

The moving target echoes will have a frequency $f_{if_{MT}}$, which is

Moving target signal frequency=$f_{if_{MT}}$=$(f_0-f_L)+f_d$ where $f_d$ is the Doppler shift frequency produced by the moving target. These resultant intermediate frequency signals are impressed on an intermediate frequency amplifier 22 where they are amplified and the output of the intermediate frequency amplifier is impressed on a limiter 24, which limits the maximum amplitude of the signals impressed upon it to a predetermined maximum volume. Dotted lines 46 and 48 in Fig. 1 illustrate diagrammatically the fact that frequency multipliers 44 and 43 may be inserted in the receiving and comparison signal channels 19 and 23, respectively, for increasing the frequency difference between the frequencies of the echoes produced by moving targets and the comparison signals produced by comparison signal channel 33. This will be discussed more in detail upon the completion of the description of the entire system. Since all the intelligence signals are subsequently compared with the reference signals generated by the comparison signal channel 33, it is obvious that the amplitudes of all the signals in both channels must be equal for obtaining proper comparison and complete cancellation or balancing out of the signals received from all fixed targets.

The output of limiter 24 is impressed on a frequency discriminator 26, which has a characteristic illustrated in Fig. 2. This discriminator, according to Fig. 2, has an output equal to zero when frequency $f_{if_S}$ is impressed thereon, and generates either positive or negative voltage when the frequency of the signal impressed upon it departs from frequency $f_{if_s}$. Accordingly, this discriminator will not produce any signal in its output in response to the echo signals from fixed targets since the frequency of these echo signals is equal to $f_{if_s}$ so long as the frequency $f_0$ of transmitter 12 remains constant. However, it will generate a voltage $V_d$ in response to echo signals produced by a moving target, this voltage being applied to a frequency $f_{if_{MT}}$. It is this signal that is impressed on a subtraction circuit 28 in the presentation channel 17 where it is compared with the signal generated by the comparison signal channel 33. When receiving channel 19 and the comparison signal channel 33 function properly; (i.e., the amplitudes and the frequencies of all signals except the echoes from moving targets in both channels are equal) the signal generated by the comparison channel is equal to the signal generated by the receiving channel for fixed targets. Also, when the frequencies of the transmitter, stabilized local oscillator and of the coherent frequency generator remain constant, which is the case when there is a substantially perfect stability, then the output of the receiving channel 19 is equal to zero, and the output of the comparison channel is also equal to zero, with the result that no signals appear at the subtraction circuit 28 for fixed targets. This being the case, there are no signals impressed on the video amplifier 30, or on presentation oscilloscope 32, with the result that all fixed echo targets will be eliminated from the screen of the oscilloscope. However, for a moving target, a voltage signal, comparable to $V_d$ in Fig. 2, will appear in the output of subtraction circuit 28 and, upon its amplification in video amplifier 30, it will produce a visual signal on oscilloscope 32. Since radar oscilloscope presentations, and circuits for obtaining them, are well known in the art, these possible modes of presentation are illustrated generically as "Presentation Oscilloscope" in the block diagram in Fig. 1, which may include a plurality of oscilloscopes.

The comparison signal channel begins with a mixer 34, which is connected on its input side to transmitter 12 and also to stabilized oscillator 21. The circuit of mixer 34 is of the coincidence type which generates an output signal only when there is a coincidence of the two signals impressed upon its input circuit. Accordingly, only a pulse signal will appear in its output, the duration and the time of its occurrence, or its phase with respect to the phase of the transmitted pulse, corresponding to the duration and phase, or the time of occurrence, of the exploratory pulse generated by transmitter 12. As mentioned previously, since the center frequency of the transmitted pulse is equal to $f_0$, and the frequency of stabilized local oscillator 21 is equal to $f_L$, it follows that the output of mixer 34 will have an intermediate frequency $$f_{if} = f_0 - f_L$$

The output of the mixer is impressed on a coherent intermediate frequency generator 36, which generates a continuous wave having a frequency $f_{if}$, with the result that the coherent frequency generator produces an intermediate frequency signal in the comparison channel; i.e., the same intermediate frequency which normally is obtainable in receiving channel 19 in the output of mixer 20. This continuous wave is impressed on a gate circuit 38, the input of which is connected to the coherent frequency generator, as well as to the output of limiter 24 with the result that a continuous series of pulses having a frequency equal to the frequency $f_{if}$ appears in the output of gate 38. Since the conductivity of gate circuit 38 is controlled by the output of limiter 24, it follows that the occurrences of the pulses appearing in the output of gate circuit 38 will be in strict coincident relationship with the corresponding echo pulses appearing in receiving channel 19. These pulses are then impressed on frequency multiplier 43, when such is used, and then on limiter 40, the latter being identical to limiter 24 in receiving channel 19; the output of the latter, in turn, is impressed on frequency discriminator 42, identical to frequency discriminator 26 in the intelligence channel. Thus, the comparison signal, produced by channel 33, normally has the same frequency and amplitude as the signals from the stationary objects as they appear in channel 19.

As stated previously, as long as the frequency of transmitter 12, stabilized local oscillator 21, and coherent frequency generator 36 remain constant, so that the frequencies reaching frequency discriminators 42 and 26 are equal in both cases, no signal appears in the outputs of the discriminators, and all stationary target signals will be eliminated at the discriminator stage of the system. Therefore, if it were not for the frequency drifts in the transmitter, the comparison signal channel could have been eliminated altogether. However, if there is any change in the transmitted frequency, the receiving and the comparison signal channels will be affected equally by this change, and signals of equal amplitudes will appear in the outputs of the discriminators 42 and 26. These two signals are then impressed on subtraction circuit 28 where they cancel each other out. The signals from moving targets are not cancelled out in subtraction circuit 28 because each has an amplitude comparable to that illustrated at $V_d$ in Fig. 2, which appears in the output of discriminator 26, and which always will differ from the amplitude of the signals produced by stationary targets because of the Doppler frequency $f_d$. Therefore, irrespective of the stability of the transmitted frequency, $f_0$, there will be a continuous cancellation of echoes produced by stationary objects. When $f_0$ is equal to the center frequency of the transmitted pulse, such cancellation will take place at the discriminator stage; when there is a shift in $f_0$, such cancellation will take place at subtraction circuit 28. Accordingly, in either case, only echoes from moving targets appear as images on the screen of presentation oscilloscope 32. It is this deviation in the transmitted frequency, $f_0$, that requires the use of comparison signal channel 33.

It should be noted here also that should there be any instability, however slight, in the frequency of stabilized local oscillator 21, both channels 33 and 19 will be affected equally by such frequency shift, with the result that all stationary targets will be eliminated, in such case, at subtraction circuit 28. Stated differently, lack of frequency stabilities in the transmitter and the stabilized local oscillator 21 affect the entire system in the same manner, and in either case the stationary target echoes are eliminated at the subtraction circuit. Thus, the disclosed system is a self-compensating system insofar as the small long-time frequency instabilities are concerned. What has been stated above about self-compensating features of the system is true when there is a perfect balance between the two channels, i.e., the identical components in the receiving and comparison signal channels maintain identical characteristics and, therefore, equal outputs. When this is not the case, echoes from stationary targets are apt to appear on the oscilloscope screen. The system may be compensated to a considerable extent against such instability by connecting a biasing circuit 50 between the output of subtraction circuit 28 and coherent frequency generator 36, the direct current potential appearing in the output of the biasing circuit being a function of the average amplitude of the signals appearing in the output of subtraction circuit 28. In addition, biasing circuit 50 is adjusted to act as a fast-acting circuit. In this respect, therefore, biasing circuit 50 functions as a well-known automatic volume control circuit. Its output, however, does not control the amplitude of the coherent frequency generator, as is the case with the automatic volume control circuits, but instead controls the frequency of the coherent frequency generator in the direction producing cancellation of fixed target echoes in the subtraction circuit.

For example, if there is an unbalance between the receiver and comparison signal channels, the average amplitude of the signals from subtraction circuit 28 will increase appreciably. This is due to the fact that stationary target echoes and the signals representing them generally far outnumber moving target echo signals. In order to reduce this average amplitude, and thereby minimize stationary target echo signals, there is impressed on coherent frequency generator 36 from biasing circuit 50 a new direct current potential. As a result, the continuous wave generated by coherent frequency generator 36 is shifted in frequency by an amount which equalizes the corresponding comparison signals and stationary target echo signals impressed on subtraction circuit 28. It is necessary to control the frequency rather than the amplitude of the coherent frequency oscillator in this case since its output eventually is impressed on limiter 40 and frequency discriminator 42. Obviously, these circuits would nullify any amplitude variations. The use of this circuit becomes optional, when the stabilities of the limiter and frequency discriminator are made sufficiently stable to dispense with the biasing circuit.

Fig. 1 also discloses the use of frequency multipliers 44 and 43 in the receiving and the comparison signal channels. The use of these frequency multipliers is optional which is indicated by the dotted lines 46 and 48. When the frequency multipliers are used, the connections are as indicated in the figures, and it is obvious that if they are not used, lines 46 and 48 become one line. The desirability of inserting frequency multipliers in both channels is based on the fact that the Doppler frequency shift $f_d$ is rather small as compared to the magnitude of the intermediate frequency. In order to enlarge this difference, two identical frequency multipliers 44 and 43 may be inserted in the respective channels. Such frequency multiplication will enlarge the amplitude of the useful signals, and thus enhance the ratio of moving target signal to fixed target signal in the last stages of the respective channels, with the result that more positive indication of moving targets will be obtained on presentation oscilloscope 32.

Fig. 3 discloses the second version of the single-pulse moving target indicating system. The transmitting channel in Fig. 3 is identical to the transmitting channel in Fig. 1. It includes a modulator 321, a transmitter 322, a TR box 324, and a directional antenna 326. The difference resides in the receiving channel 304, the reference signal channel 306, and especially in the presentation or reproducing channel 320. The receiving channel includes a cascade connection of a mixer 303, an I.F. amplifier 305, a frequency multiplier 301, and a limiter 308, the output of the latter being applied to a phase detector 312 in the presentation channel. The reference signal channel includes a cascade connection of a mixer 305, an intermediate frequency coherent oscillator 307, a frequency multiplier 300, and a limiter 310, the output of the latter being applied to the input side of the phase detector 312. The following elements are connected in series in reproducing channel 320: Phase detector 312, a differentiator 314, a broad band bi-polar video amplifier 316, a limiter 317, a narrow band bi-polar video amplifier 318, and a presentation oscilloscope 319. As in the case of Fig. 1, the intermediate frequencies are obtained in the receiving and reference signal channels 304 and 306 by impressing the output of a stabilized local oscillator 328 on mixers 303 and 309. The stabilized local oscillator 328 is identical to that of Fig. 1, performs the same function as the same oscillator in Fig. 1, and therefore needs no additional description. The same is true of the mixers 303, 309, coherent intermediate frequency oscillator 307, intermediate frequency amplifier 305, and limiters 308 and 310. Since the use of the frequency multipliers 300 and 301 is optional, which will be described more in detail later, the chief difference therefore resides in what is connected to the outputs of the limiters; i.e., in reproducing channel 320. All echo signals appearing in the output of limiter 308 are impressed on phase detector 312, where their phase is compared with the phase of the reference signals also impressed on the same phase detector by limiter 310.

Figure 5:
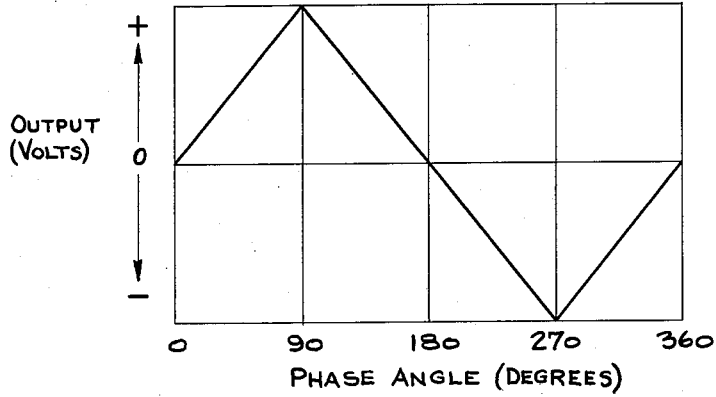
Fig. 5 illustrates an output voltage characteristic as a function of phase angle in the systems disclosed in Figs. 3 and 7.

A typical output curve of a phase detector is illustrated in Fig. 5 with the phase angle between the outputs of the limiters 308 and 310 being plotted along the abscissa and the output voltage along the ordinate. From this curve, it follows that the phase detector will generate a signal of constant amplitude as long as the phase of the signals impressed upon it by the limiters 308 and 310 remain constant, which is the case when stationary target echoes are compared in the phase detector with the reference signals. Therefore, the type of signal appearing in the output of phase detector 312, under such circumstances, is of the type illustrated at 400 or 401, Fig. 4; they are constant amplitude bi-polar signals, the polarity of the signal being determined by the phase of the rising signal. Since the amplitude of the signal appearing in the phase detector is a function of the phase difference between the reference signal and the incoming echoes, it follows that the signal appearing in the output of phase detector 312, in response to moving target echoes, will have a waveform which is of the type illustrated at 402 or 403, since the phase is changing due to the frequency difference. This signal may have either positive or negative polarity and the top portions 404 and 405 of the signals will have a slope, with respect to the time axes 406 and 407, represented by $\angle \theta$ in Fig. 4, which will be a function of the Doppler frequency shift produced by a moving object. This angle may be either a positive or negative angle, depending upon the phase change of the echo signal with respect to the reference signal. The larger is the rate of change in the phase relationship between the moving target echo and the reference signal, the larger is the $\angle \theta$. Phase detector circuits of this type are known in the art, one of such circuits being disclosed in the proceedings of the Institute of Radio Engineers, December 1949, page 1401.

The signals illustrated at 400 through 403 are impressed on the differentiator 314, the output of which is illustrated at 4–C and 4–D in Fig. 4. Examination of these oscillograms reveals the fact that the slope portions 404 and 405 of the moving target echoes will produce signals 408 and 409, while the leading and the lagging edges of the waveforms 402 and 403 will produce signals 410, 411, 412, and 413. The signals are impressed on broad band bi-polar video amplifier 316, which amplifies the signals quite faithfully. The signals from the fixed and moving targets are then limited to the same level with limiter 317. Hence, after amplification in amplifier 316 and amplitude-limiting action in limiter 317, the signals appearing in the output of limiter 317 will have the waveforms illustrated at 4–E and 4–F in Fig. 4. The signals are then impressed on narrow band bi-polar video amplifier 318 where narrow pulses 410, 411, 412, and 413 are eliminated altogether and portions 408 and 409 are amplified and somewhat distorted, with the result that the outputs of narrow band bi-polar video amplifier 318 has the waveforms as illustrated at 4–G and 4–H in Fig. 4.

Since the signals produced by the stationary targets have fixed amplitudes, as illustrated at 400 and 401, upon their differentiation by differentiator 314, they will assume the form of narrow pulses 416—418 and 420—422. These pulses will be amplified by broad band amplifier 316, and limited with limiter 317, with the result that broad pulses 408 and 409 will be increased in amplitude relative to narrow pulses 410—411, 416—418, 412—413, and 420—422. The non-linear action of the limiter 317 reduces the amplitudes of these signals to the amplitude of pulses 450 and 451. However all of these narrow pulses will be substantially eliminated by narrow band bi-polar video amplifier 317, with the result that they appear only as very minor amplitude fluctuations 425—427 and 429—431, illustrated at 4-G and 4-H of Fig. 4. It is the signals appearing at 4-G and 4-H in Fig. 4 that are impressed on presentation oscilloscope 319, with the result that only moving target signals 455 and 456 will appear on the screen of the oscilloscope, with the stationary targets being eliminated with the aid of phase detector 312, differentiator 314, limiter 317, and narrow band bi-polar amplifier 318. As previously stated, the main advantage of this system resides in the fact that its operation does not depend on the exact duplication of limiters and frequency discriminators in the receiving and comparison signal channels.

The use of the frequency multipliers 301 and 300 in the receiving and reference channels is optional, as stated previously in connection with the description of Fig. 1; i.e., the description of these multipliers in connection with Fig. 1 is equally applicable to Fig. 3. The fact that the use of the multipliers is optional is indicated by the dotted lines 330 and 332. They enlarge the difference between $f_{if}$ and $f_d$ and thus enlarge $\angle\theta$, Fig. 4, which, in turn, enlages the magnitude of the differentiated portions 408 and 409 of the moving target echoes.

According to another version of the moving target indicating system, illustrated in Fig. 6, in order to reduce transmitter frequency changes, or the generation of frequency spectrums, the entire system, including transmitting, receiving, and comparison signal channels, is frequency controlled by a local crystal-controlled oscillator. Frequency multipliers are used for obtaining a sufficiently high transmitting frequency and local oscillator frequency for heterodyning received echoes. Frequency multiplication is also used for obtaining the intermediate frequency signal of the comparison signal channel. As in the previous system, frequency discriminators are used for generating video signals in response to any frequency which differs from the center intermediate frequency. The advantage of this system resides in the fact that since the crystal-controlled oscillator controls the frequencies of all channels, the possibility of encountering frequency instabilities in the transmitting channel are reduced to the minimum obtainable with crystal-controlled oscillators. Nevertheless, since even with this rigorous method of controlling frequencies, frequency instabilities may be encountered, it is necessary to use a comparison signal channel for eliminating the signals from fixed targets when the echoes have a different frequency than the center intermediate frequency. The above modification is equally applicable to the system disclosed in Fig. 1, as well as Fig. 3. Fig. 6 discloses the application of this modification to the system using the frequency discriminators and the subtraction circuit, while Fig. 7 is the application of the same teachings to the system utilizing the phase detector, the differentiator and the narrow band amplifier.

Referring to Fig. 6, the receiving channel 600, the comparison signal channel 603, and the presentation channel 602 of Fig. 6 are identical to the same channels in Fig. 1, and therefore need no additional description. The modification resides in the transmitting channel and synchronizing components of the system where a crystal-controlled oscillator 604 and frequency multipliers 606, 607, and 609 are used. The crystal-controlled oscillator 604 generates a high frequency signal, which is multiplied by frequency multipliers 606 and 607, so that the output of the latter is in the microwave range. This signal is impressed on a transmitter 614 which is keyed by a modulator 616. The modulator itself is connected to a blocking oscillator 618 or a crystal-controlled oscillator, which periodically renders modulator 616 operative. The resulting pulse generated by the transmitter is impressed on highly directional antenna 620 in the usual manner through a TR box 621.

The output of frequency multiplier 606 is impressed on a gate circuit 608 keyed by the echo signals appearing in the receiving channel in the output of limiter 601. Limiter 610 and frequency discriminator 605 are identical to those disclosed in Fig. 1. An additional frequency multiplier 609 is interposed between multiplier 606 and local frequency oscillator 612, the output of multiplier 609 being in the microwave range since the frequency of the local frequency oscillator is in the microwave range. The frequency of the local frequency oscillator 612 is therefore under constant control of the crystal-controlled oscillator 604.

The functioning of this system is identical to that disclosed in Fig. 1, with the following modifications: The frequency of transmitter 614 is made more stable in this system since the frequency of the entire transmitting channel is controlled by crystal oscillator 604. The same improvement in frequency stability is also obtained at stabilized local oscillator 612 since it is also controlled by crystal-controlled oscillator 604 through frequency multipliers 606 and 609. It is to be understood that amplification may be resorted to at any stage of frequency multiplication. The frequency multiplication must be such that the difference in the output frequencies of multipliers 607 and 609 is equal to the intermediate frequency of the receiving channel.

As before, the Doppler frequency will produce a signal substantially proportional to the Doppler frequency in the output of discriminator 619. It is this signal that is used for obtaining presentations on oscilloscope 626. The use of frequency multipliers 622 and 624 in connection with the system disclosed in Fig. 6 is optional. The function performed by these frequency multipliers has been discussed in connection with Fig. 3, where these multipliers appear as frequency multipliers 301 and 300 in the receiving and comparison or reference signal channels.

Fig. 7 which discloses the application of the crystal-controlled oscillator technique to the system of the type which has been disclosed in connection with Fig. 3, i.e., the system using phase detector-differentiator-narrow band amplifier in the presentation channel, does not need any detailed description since the transmitting channel in this figure is identical to that used in connection with Fig. 6, while the remaining part of the system including receiving channel 700, reference signal channel 701, and presentation channel 702 are identical to those disclosed in Fig. 3. The advantages of this system are the same as those of Fig. 3, and the additional advantages obtainable with the crystal controlled oscillator are the same as the ones that have been described in connection with Fig. 6. Thus the disclosed system possesses optimum obtainable frequency stability and synchronization of the receiving and of the reference signal channels. Because of the use of the phase detector-differentiator-narrow band amplifier in the reproducing channel 702, the operation of the system does not depend on the exact duplication and stabilities of limiters and frequency discriminator in both channels. As in the case of Fig. 6, the use of the frequency multipliers 703 and 704 is optional.

What is claimed is:

1. In a radar system for transmitting a carrier wave pulse of substantially fixed frequency and for receiving echoes of the pulse returned from stationary and moving targets, a receiver for the echo pulses from the stationary and moving targets, said receiver including means for converting said echo pulses to corresponding intermediate frequency signals, the intermediate frequency signals corresponding to the stationary target echo pulses having a predetermined frequency, and the intermediate frequency signals corresponding to the moving target echo pulses having frequencies different from said predetermined frequency in accordance with the Doppler principle;

means for generating a reference signal having a frequency substantially equal to said predetermined frequency; first means coupled to said reference signal generating means and operative to develop a signal having an amplitude proportional to said predetermined intermediate frequency, and second means coupled to said converting means and operative to develop respective signals having amplitudes which correspond to the frequencies of the echo pulses from the stationary and moving targets, whereby the amplitudes of the signals corresponding to said reference signal and to the stationary target echo pulses are equal; and amplitude comparison means, said comparison means being coupled to said first and second means, said comparison means being operative to develop output signals only in response to signals from said first and second means which differ in amplitude, whereby output signal indications only of moving targets are obtained.

2. The combination defined in claim 1, wherein said amplitude comparison means includes a subtraction circuit, said subtraction circuit being coupled to said first and second means to derive said output signals, an amplifier coupled to said subtraction circuit for amplifying said output signals, and a visual presentation device coupled to said amplifier, said visual presentation device being coupled to said amplifier and operative to provide visual indications of the amplified output signals.

3. The combination defined in claim 2, further including a direct-current biasing network for said generating means, said biasing network being connected between said subtraction circuit and said generating means, said biasing network being adapted to develop D.-C. signals to control the frequency of operation of said generating means for nullifying any unbalance between said first and second means which tends to cause an undesirable increase in the average amplitude of said output signals.

4. The combination defined in claim 1 in which said second means includes an amplitude limiter circuit, said limiter circuit being coupled to said converting means, a frequency discriminator coupled to said limiter to develop said respective signals, and said limiter circuit also being coupled to said first means to control the operation of said first means.

5. In a moving target indicating system which transmits exploratory pulses of carrier frequency radiant energy and receive corresponding echo pulses, wherein the carrier frequencies of successive echo pulses manifesting fixed objects bear a substantially constant relation to said transmitted carrier frequency, and wherein the carrier frequencies of echo pulses from moving objects differ from that of the transmitted carrier frequency: a receiver for said echo pulses, said receiver including means for limiting the amplitude of said echo pulses; means for developing reference oscillations of fixed amplitude and of a frequency which is a function of the transmitted carrier frequency, and means coupling said limiting means and said means for developing reference oscillations to develop output signals whose amplitudes represent only the differences in frequency between said reference oscillations and the carrier frequencies of the echo pulses from moving objects, whereby said system is insensitive to echo pulses from fixed objects.

6. The combination defined in claim 5 in which said means for generating said reference oscillations includes an oscillator for developing output waves at a predetermined intermediate frequency, and limiter coupled to said oscillator to maintain said output waves at a predetermined amplitude.

7. The combination defined in claim 5 in which said means for developing output signals includes a pair of frequency discriminators, said discriminators being respectively connected to said limiting means and said reference oscillations generating means, said discriminators being operative to develop output signals having amplitudes which represent the outputs of said limiting means and said reference oscillations generating means, and means coupled to both of said frequency discriminators and operative to develop video signals only in response to the output signals from said frequency discriminators which have a predetermined amplitude difference, wherein the output signals from said frequency discriminators which have less than said predetermined amplitude difference are representative of the echo pulses from said fixed objects.

References Cited in the file of this patent

UNITED STATES PATENTS

| | | |
|---|---|---|
| 2,406,316 | Blumlein et al. | Aug. 27, 1946 |
| 2,548,779 | Emslie | Apr. 10, 1951 |
| 2,555,121 | Emslie | May 29, 1951 |
| 2,586,028 | Grayson et al. | Feb. 19, 1952 |